(No Model.) 3 Sheets—Sheet 1.

G. A. KERR.
CENTRIFUGAL MACHINE FOR REFINING STARCH.

No. 473,511. Patented Apr. 26, 1892.

Attest:
L. Lee
J. Van Wert Jr.

Inventor.
G. A. Kerr, per
Crane & Miller, Attys.

(No Model.) 3 Sheets—Sheet 2.
G. A. KERR.
CENTRIFUGAL MACHINE FOR REFINING STARCH.
No. 473,511. Patented Apr. 26, 1892.
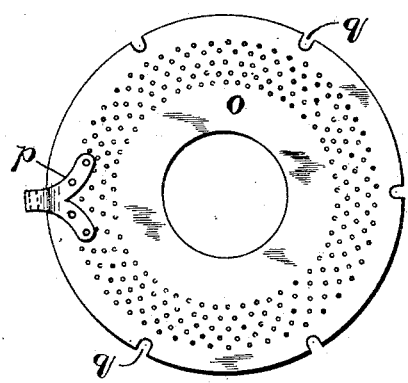
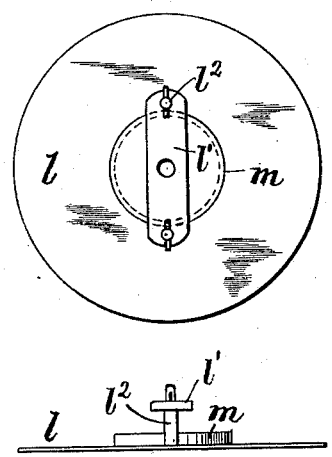
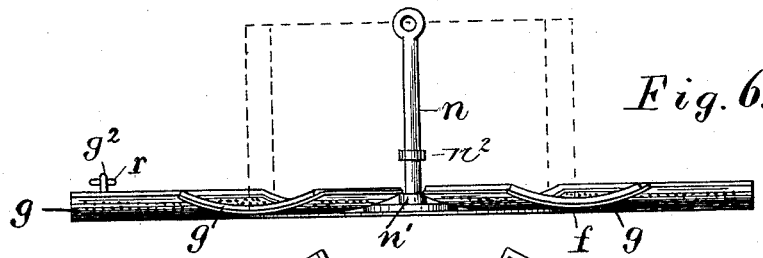
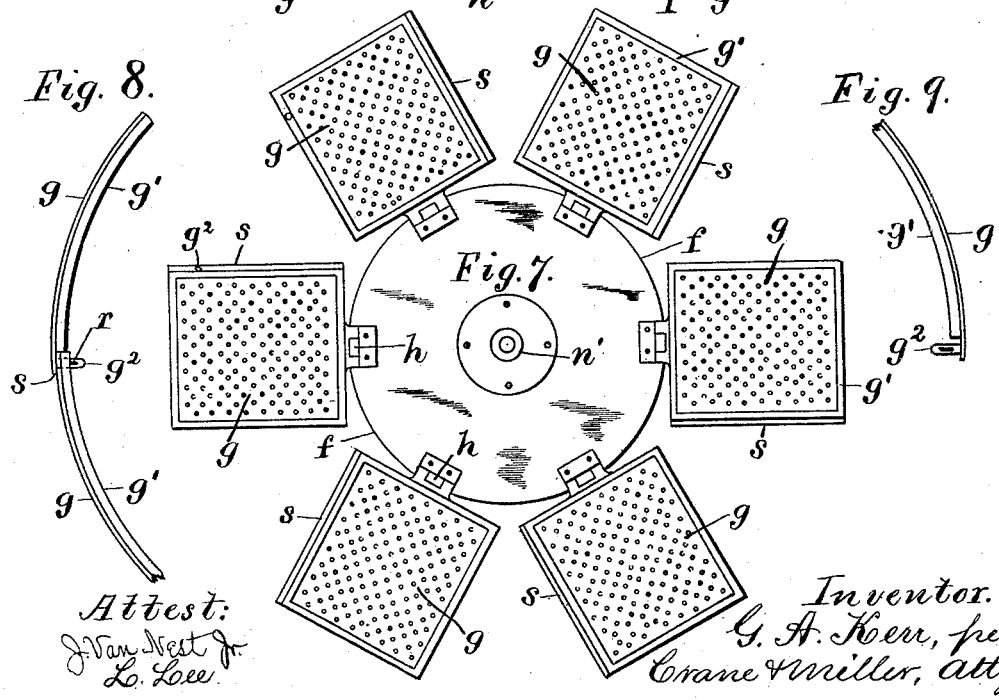
Attest:
J. Van Nest Jr.
L. Lee
Inventor.
G. A. Kerr, per
Crane & Miller, Attys.

(No Model.) 3 Sheets—Sheet 3.
G. A. KERR.
CENTRIFUGAL MACHINE FOR REFINING STARCH.
No. 473,511. Patented Apr. 26, 1892.
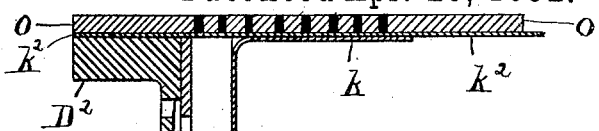
Fig. 11.
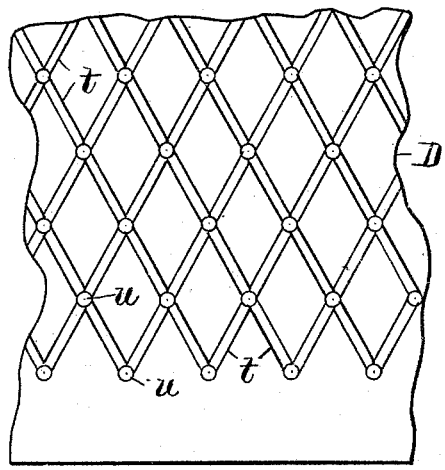
Fig. 10.
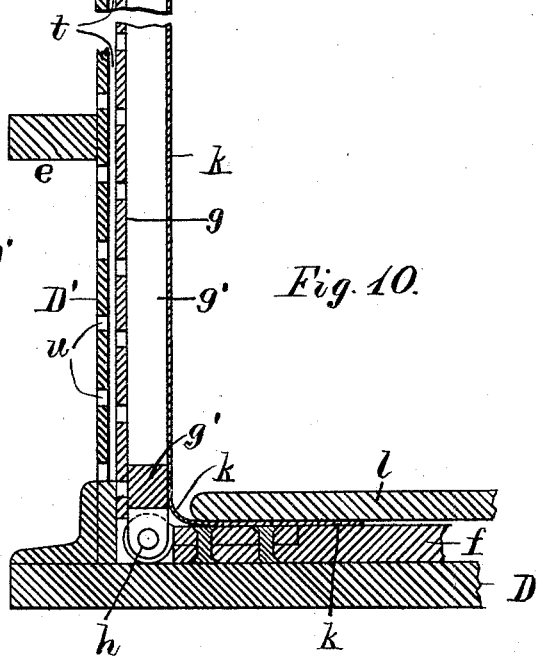
Fig. 12.
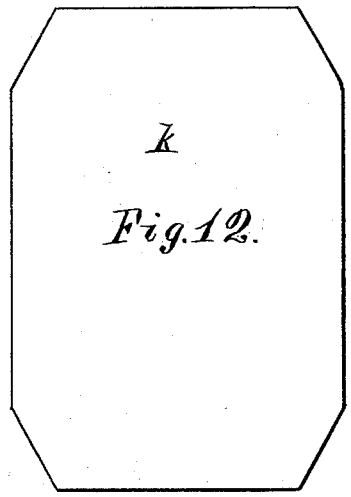
Fig. 13.
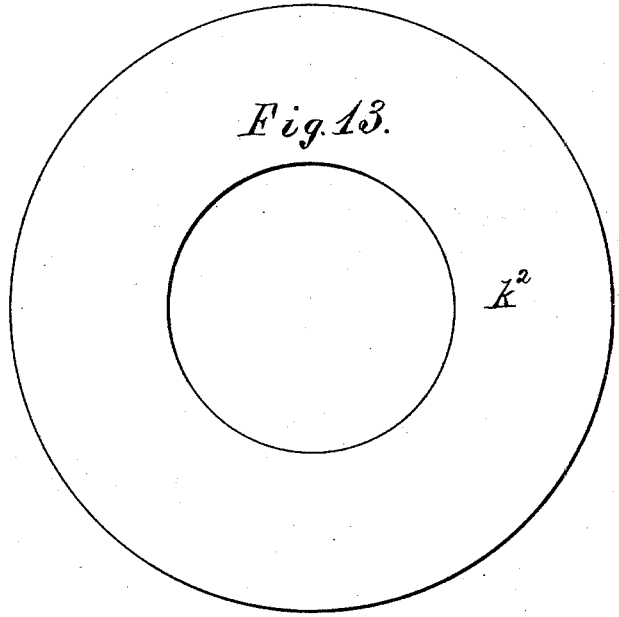
Attest:
L. Lee.
J. Van Nest Jr.
Inventor.
G. A. Kerr, per
Crane & Miller, Attys

UNITED STATES PATENT OFFICE.

GEORGE A. KERR, OF COLUMBUS, INDIANA.

CENTRIFUGAL MACHINE FOR REFINING STARCH.

SPECIFICATION forming part of Letters Patent No. 473,511, dated April 26, 1892.

Application filed December 4, 1891. Serial No. 413,979. (No model.)

*To all whom it may concern:*

Be it known that I, GEORGE A. KERR, a citizen of the United States, residing at Columbus, Bartholomew county, Indiana, have invented certain new and useful Improvements in Centrifugal Machines for Starch-Refining, fully described and represented in the following specification and the accompanying drawings, forming a part of the same.

This invention relates to certain improvements in the drum or cylinder of the centrifugal machines used in starch-refining.

The object of the invention is to facilitate the removal of the starch from the drum when the fluid is wholly separated therefrom; and the invention consists, chiefly, in the combination, with the centrifugal drum, of a perforated basket movable from the drum and provided with sectional or movable walls to facilitate the removal of the starch from the basket.

The invention also consists in means for holding within the basket cloths adapted to strain the fluid from the starch and in radial partitions movable from the basket, for the purpose hereinafter described.

The annexed drawings show the preferred form of my invention; but the details of construction may be modified without departing therefrom.

Figure 1:
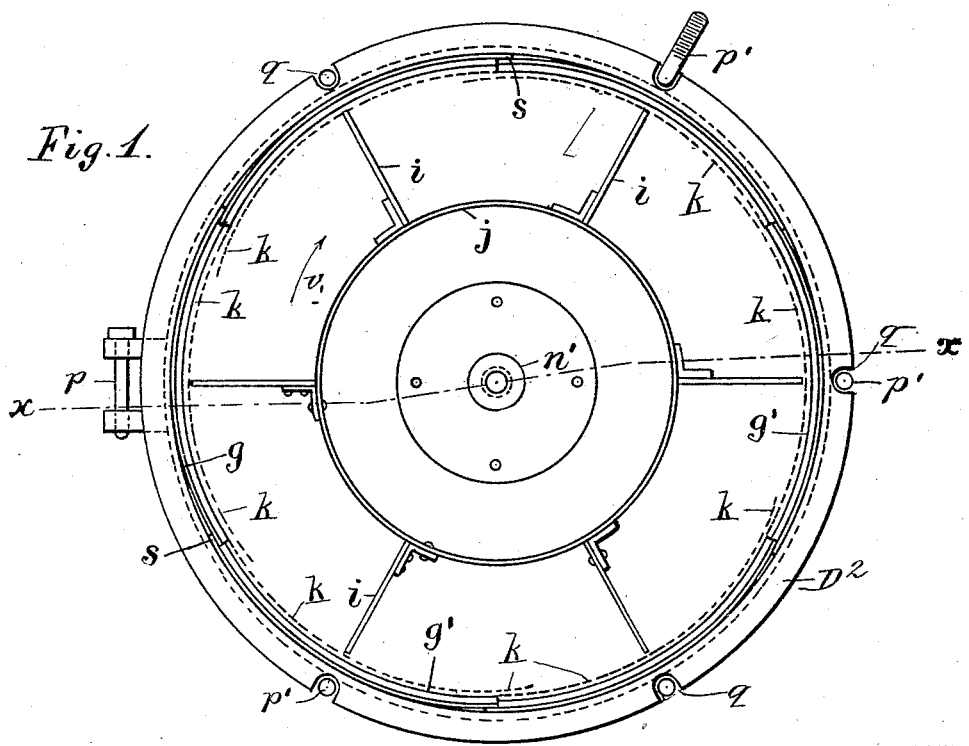
Figure 2:
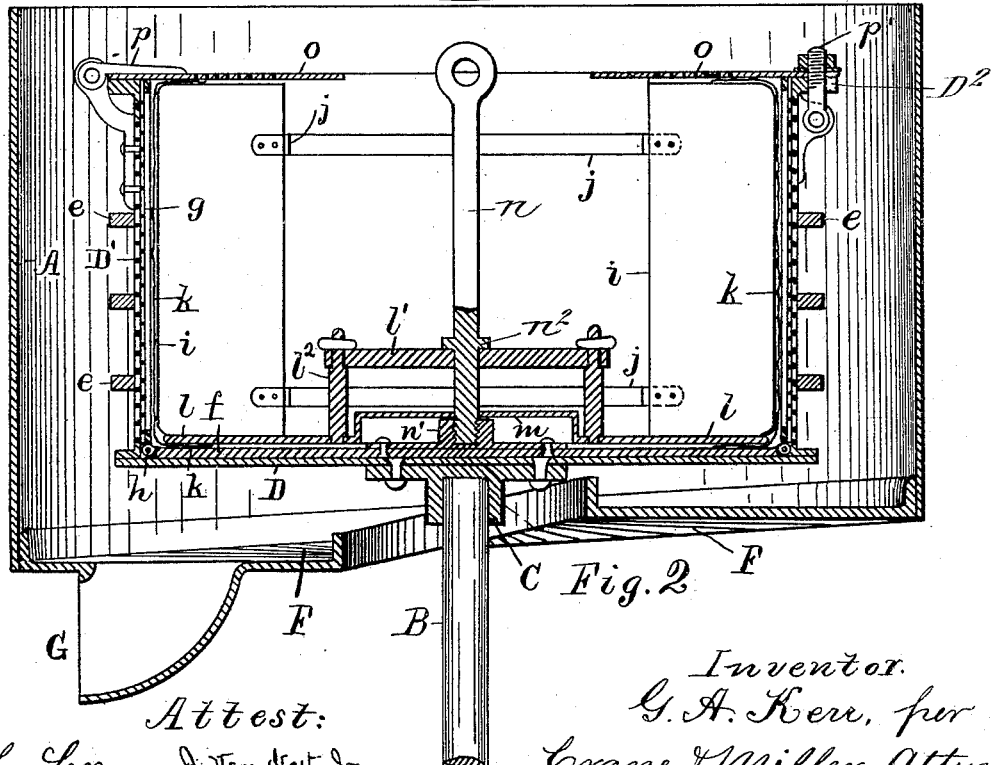

Figure 1 is a plan of the drum, the cover being omitted to expose the removable basket and partitions. Fig. 2 is a vertical section on line $x\ x$ in Fig. 1. Fig. 3 is a plan of the cover. Fig. 4 is a plan of the clamp-plate; Fig. 5, an edge view of the same; Fig. 6, an edge view of the basket with the segments shown in full lines as they appear when thrown outward and in dotted lines as they appear when closed together in cylinder form. Fig. 7 is a plan of the basket with the segments thrown outward. Fig. 8 shows a portion of two segments with their adjacent edges connected by a key-bolt, and Fig. 9 shows a part of the segment having the bolt attached. Fig. 10 is an enlarged sectional view of one side of the drum; Fig. 11, an inside view of portion of the drum sides D'; Fig. 12, a diagram of one of the straining-cloths to fit within the sides of the basket; and Fig. 13 is a plan of the straining-cloth to fit beneath the perforated cover. Fig. 2 shows the parts in their operative relation, but only the curb and basket with its driving-shaft are shown, as the invention relates only to such parts.

A is the curb, and B is the driving-shaft fitted to hub C upon the bottom of the drum. The bottom D of the drum is imperforate, but the sides D' are made of perforated metal to permit the discharge of the fluid, the sides being strengthened by bands $e$, as is common in such constructions. The bottom F of the curb is formed of helical shape with an outlet G at the lowest point. This construction is indicated in Fig. 2, it being understood that the portion of the bottom which is cut away by the section plane would extend from the right side of the curb to a higher point upon the left side than the outlet G. The fluid discharged from the rotating drum strikes the sides of the curb and falling upon the slope of the helical bottom is carried rapidly to the outlet G and thus discharged very freely. The removable basket is formed of a false bottom $f$, with a cylindrical shell, formed of segments $g$, jointed to the false bottom by hinges $h$. The segments, as shown in Figs. 6 and 7, are formed of thin perforated metal stiffened each by a frame $g'$. A projecting flange $s$ is formed at one edge of each segment to hold the adjoining segment in place when the segments are folded together in cylindrical form, and one of the flanges is provided with a key-bolt $g^2$, fitted through a hole in the adjacent segment, as shown in Fig. 8, and provided with a key $r$, which, when inserted, holds all the segments securely together. The segments are shown in Figs. 6 and 7 turned outwardly from the false bottom $f$, but are shown in Fig. 1 folded into cylindrical form to fit within the sides of the drum D'. In Fig. 1 cloths $k$ are shown fitted within the shell of the basket with their lower edges extending downward upon the false bottom $f$, and a clamp-plate $l$, provided in the center with a cap $m$, is shown resting upon the edges of the cloths and operates to hold them in position. One of the cloths is shown detached in Fig. 12 and cut with tapering ends to fit the ends of the cloths to the circular shape of the bottom $f$ and cover $o$ of the drum.

In Fig. 1 six of the cloths $k$ are shown with one edge of each cloth overlapped upon the edge of the adjoining cloth in a direction opposite to that in which the drum rotates, which is indicated by the arrow $v$. The six cloths thus arranged form a layer of straining material inside of the basket, and although only one such layer is shown in Fig. 1 two layers would be preferably used in practice to form a more perfect strainer.

A bridge $l'$ is shown attached to the clamp-plate by studs $l^2$, and a lifting-rod $n$ is shown inserted through the bridge and cap $m$ and screwed into a boss $n'$, attached to the false bottom $f$. A collar $n^2$ is formed upon the rod above the bridge and operates, when the rod is screwed in the false bottom, to press the bridge downward, and thus clamp the plate $l$ firmly toward the bottom of the basket.

Radial partitions $i$ are shown in Figs. 1 and 2, fitted within the basket and attached to hoops $j$, by which they may be inserted in or removed from the basket together. The upper edge of the drum is formed with a notched flange $D^2$, and an annular cover $o$ (shown in Figs. 2 and 3) is attached to the drum by hinge $p$ at one side and by clamp-bolts $p'$ hinged to the upper edge of the drum at intervals and fitted to notches $q$ in the flange and cover. The hinges upon the bolts permit them to release the cover as soon as the nuts are slackened by turning the bolts outwardly, as shown at the upper side of Fig. 1. An annular cloth $k^2$ (shown separately in Fig. 13) fits under the cover over the top of the drum and partitions $i$.

The perforations in the drum in its cover and in the basket permit the fluid which is separated from the starch to escape freely through the cloths $k$ and $k^2$ when the drum is rotated, and the partitions perform the double function of drying the starch-milk when it is placed in the drum and of cutting the final product of starch into segments for rapid removal from the basket. Without the partitions the starch-milk slips within the drum, and its maximum speed can only be secured after considerable delay.

The apparatus is prepared for use as follows: The segments forming the shell of the basket are folded together and secured by the key-bolt $q^2$ or any other suitable fastening. The cloths $k$ are then carefully fitted within the shell, with their lower ends resting upon the bottom $f$. The clamp-plate $l$ is then inserted within the basket with its margin resting upon the edges of the cloths. The lifting-rod $n$ is then screwed in the boss $n'$ upon the bottom $f$, thus clamping the plate $l$ firmly upon the cloths. The series of partitions is then set within the basket, their lower ends resting upon the clamp-plate $l$ and their outer edges close to the cloths $k$. By a suitable hoisting apparatus the basket is then placed within the drum and the cloth $k^2$ applied over the flange $D^2$ and the top edges of the partitions $i$, the cloth lying upon the upper ends of the cloths $k$, where the latter are bent inward over the tops of the partitions. The cloth $k^2$ is shown only in Fig. 10, as the scale of the other figures is too small to illustrate it clearly. The cover is then closed and the cloth and cover clamped by the bolts $p'$. The drum is rotated slowly at first, and the starch-milk is then supplied to the drum by a chute and the milk is distributed equally in the spaces between the partitions $i$, and the drum is thus properly balanced. When the basket is charged, the full speed of the drum is applied and maintained for twenty or thirty minutes, discharging all the fluid from the starch-milk and leaving the solid starch in a layer against the straining-cloths $k$. The machine is then stopped, the cover lifted, and the inner basket hoisted out by grappling the lifting-rod $n$. Another basket, already prepared in a suitable manner, may then be immediately placed in the drum and charged in a similar manner, so that the machine may again be set in operation without delay. The basket removed from the machine is placed upon a suitable table, the segmental sides of the basket are unfastened and let down, the cloths are then unwrapped from the periphery of the starch, and the latter is found within the same in solid cakes, standing between the partitions $i$ and in readiness to remove without any trouble or delay. The starch thus prepared is ready for scraping and drying, the small amount of moisture contained in the starch enabling it to dry in a single treatment in about four hours, instead of requiring two treatments and requiring several days' time, as is required when settling-troughs are used. It is obvious that its removal from the basket is very greatly facilitated by making the basket removable from the drum, so that it can be set upon a table and free access afforded to the operator. The removal of the starch from the basket is still further facilitated by making the sides of the basket in segments and separable from one another, so as to expose the outer surface of the starch.

By employing a basket removable from the drum the labor of digging out the starch from the periphery of the drum is entirely avoided.

The capacity of each centrifugal drum or machine may be also greatly increased by furnishing the same with two removable baskets and inserting one as soon as the other is removed. The centrifugal machine may thus be kept in continuous operation instead of arresting its use for a considerable time to discharge the starch.

When the basket is fitted within the drum, it is obvious that the centrifugal force throws the shell of the basket into close contact with the sides of the drum and that the penetration of the fluid through the basket and drum would be impeded if the holes in either the basket or drum are obstructed by the position of the parts.

To afford a free passage for the fluid from the exterior of the basket to the holes in the drum, grooves $t$ are formed upon the inner surface of the drum between the several holes $u$, as shown in Figs. 10 and 11, by which the fluid escaping through the segments $g$ finds free escape from the drum.

It is obviously immaterial how the sides of the basket be constructed to furnish an escape for the fluid and to retain the starch, and the basket may therefore be made with separable sides of any construction. The hinges $h$ and flanges $s$ furnish, however, a very convenient way of holding the shell of the basket in cylindrical form while it is lowered into the drum, after which it is immaterial whether the segments are fastened or not.

The cloths $k$ may obviously be applied in any convenient manner within the basket; but when cut into sections with parallel sides and tapering ends, as shown in Fig. 12, they are adapted each to cover one joint between the segments of the basket and to have their upper and lower ends extended parallel with the bottom of the basket and the under side of the cover. The cloth $k^2$ operates, like the cloths $k$, to form a strainer and prevent the escape from the drum of anything except the water and soluble impurities. This cloth may be made in several sections, if preferred, shaped to form a lining inside the perforations of the cover.

The operation of this machine furnishes a product containing so little water that the first drying operation which has been heretofore required when the milk is settled in troughs is entirely obviated, as well as the loss of starch, which is occasioned by scraping the surface of the starch after the first drying operation to prepare it for the final drying process. The entire time required in the dry-rooms is thus reduced from four days to about two hours, the room required for the accommodation of settling vats or troughs is entirely saved, and the total amount of labor is reduced about one-half by entirely avoiding the scraping and breaking up of the starch after the first drying operation.

A starch-factory by the use of this apparatus can not only produce a greater quantity of high-class starch, but can be operated night and day, which has never heretofore been done in the manufacture of finer qualities of starch with settling-troughs.

Having thus set forth the nature of the invention, what is claimed herein is—

1. In a centrifugal machine, the combination, with the drum, of a false bottom having perforated segments attached thereto and adapted to form a cylindrical basket, as set forth.

2. In a centrifugal machine, the combination, with the drum, of a false bottom having perforated segments hinged thereto and provided with overlapping edges, as and for the purpose set forth.

3. In a centrifugal machine, the combination, with the drum, of a false bottom having perforated segments attached thereto and a lifting-rod secured in the center of the false bottom, as set forth.

4. In a centrifugal machine, the combination, with the drum, of a perforated basket fitted removably thereto, cloths applied to the shell of the basket, and a plate fitted removably within the bottom of the basket to clamp the edges of the cloths, as herein set forth.

5. In a centrifugal machine, the combination, with the drum, of a perforated basket fitted removably thereto, cloths applied to the shell of the basket, a plate fitted removably within the bottom of the basket to clamp the edges of the cloths, a threaded boss secured to the bottom of the basket, a bridge attached to the clamping-plate, and a lifting-rod screwed into the boss and adapted to press the bridge toward the bottom of the basket, as and for the purpose set forth.

6. In a centrifugal machine, the combination, with the drum, of a perforated removable basket and radial partitions fitted removably within the basket, as and for the purpose set forth.

7. In a centrifugal machine, the combination, with the drum, of a perforated removable basket having segmental hinged sides and a series of radial partitions fitted within the basket and attached together by hoops, as and for the purpose set forth.

8. In a centrifugal machine, the combination, with the drum, of a perforated removable basket, the radial partitions $i$, attached to the hoops $j$, and the perforated cover $o$, clamped over the basket and partitions, as herein set forth.

9. In a centrifugal machine, the combination, with the rotating drum having clamp-bolts attached to its upper edge, of a perforated basket fitted within the drum and a perforated annular cover hinged at one side of the drum and adapted to engage the clamp-bolts, as herein set forth.

10. In a centrifugal machine, the combination, with a removable basket having perforated shell, of a drum adapted to receive the said basket and having perforations connected by grooves upon the inner side of the drum, as and for the purpose set forth.

11. In a centrifugal machine, the combination, with the drum, of a perforated removable basket, radial partitions removable from the basket, the perforated cover $o$, clamped over the basket and partitions, cloths $k$, applied within the shell of the basket, and a cloth $k^2$, applied between the cover and partitions and clamped in position by the cover, as and for the purpose set forth.

In testimony whereof I have hereunto set my hand in the presence of two subscribing witnesses.

GEORGE A. KERR.

Witnesses:
 MAUD CLARK,
 BERT BROWN.